United States Patent Office 2,915,428
Patented Dec. 1, 1959

2,915,428

PROCESS FOR CONTROLLING SLIME IN PAPER MAKING SYSTEMS AND PRODUCTS THEREFROM

Elliott L. Weinberg, East Brunswick Township, Middlesex County, N.J., assignor to Metal & Thermit Corporation, New York, N.Y., a corporation of New Jersey No Drawing. Application February 10, 1956
Serial No. 564,632

16 Claims. (Cl. 162—161)

The present invention is directed to a process for controlling slime content in the manufacture of paper and to the production of chemically treated paper possessing biocidal properties.

Microorganisms are a very serious problem in the paper industry. During paper processing various microorganisms form slimes in the system. These slimes adversely affect the quality of the paper prepared by causing deterioration, color changes, spotting, etc. and also increase the cost of processing. During the processing, the slimes accrete and/or coalesce into mycellial matter which tends to clog pipes, orifices, and dewatering and filtering equipment. They cause the paper to tear on the paper making machines requiring the stopping of the machine until repairs are made. The slime problem in mills is particularly acute where large quantities of the processing liquor are recirculated to conserve chemicals and to control stream polution. Various chemical treatments have been used to control slimes, the most successful being phenyl mercuric acetate and the trichlorophenols. These materials, however, are corrosive to some of the processing equipment, especially copper and Phosphor bronze equipment, cause foaming in the sulfite circuit, and are toxic both orally and dermally. In addition, the trichlorophenols have an obejctionable odor. Paper, when stored, is subject to attack by various microorganisms which cause spotting, deterioration, etc. Although many attempts have been made to control the effects of microorganisms in paper processing and on the finished product, none, so far as I am aware, has been completely successful.

I have now discovered that slime in paper processing may be controlled by a simple chemical treatment which is also effective in protecting the paper produced by the process from attack by microorganisms.

It is an object of the present invention to provide a process for manufacturing paper in which the problem caused by slime is controlled and which provides a product resistant to attack by microorganisms.

It is a further object of the invention to provide a method for controlling slime build-up in paper manufacturing operations.

The invention also contemplates providing a method for controlling microorganism growth in paper making processes utilizing a major portion of recirculated water.

Still another object of this invention is to provide a method for introducing slime-controlling chemicals into paper manufacturing processes.

Another object of the invention is to provide a paper resistant to attack by microorganisms.

Other objects and advantages will become apparent from the following description.

Paper is manufactured by a number of processes. The cheapest type of paper may be manufactured by wet grinding wood into a pulp, subjecting the pulp to various treatment and storage operations to yield a pulp in proper condition to be fed to the Fourdrinier screens (the first stage of the paper making machines). Other paper making operations are generally similar to the above except that the initial water may be chemically treated (usually chlorinated) and the pulp is subjected to various chemical treatments. Sulfite pulp is prepared by digesting wood in chlorinated water, with sulfite liquor, treating, storing and reconstituting the pulp to proper consistency for feeding to the paper making machines. Newspaper stock is commonly prepared by blending ground wood pulp and sulfite pulp. In most modern operations, large amounts of white water (usually about 65–85%) are recirculated in the system. Experience has shown that a large variety of microorganisms (both plant and animal, herein generally referred to as "slimes") thrive in the pulps and white water during the paper making operations. It is believed that these microorganisms tend to grow in the quiescent and/or eddy portions of the systems, i.e., in the storage areas and in the "dead" areas of the sluice and piping system bypassed by the rapid fluid flow.

The present invention contemplates the improvement in the paper making process of introducing into the pulp system small but effective amounts of bis tributyltin oxide to control the quantity of microorganisms in the system to an amount insufficient to deleteriously interfere with the paper making process. Substantially, all of the tin added in the form of bis tributyltin oxide goes into the paper manufactured by the process. The papers thus manufactured are resistant to attack by microorganisms.

Bis tributyltin oxide dissolves in water in amounts as large as about 0.1% only after prolonged agitation. Its initial solubility in water is in the order of 10 to 20 parts per million. Slimes are effectively controlled in paper processing systems (1) by feeding to the system an emulsion or a self-emulsifiable concentrate of bis tributyltin oxide, with a material such as Triton X–100 (a proprietary alkylated aryl polyether alcohol); (2) by treating surfaces in the system with bis tributyltin oxide, the treated surfaces may be prepared by incorporating the chemical into the material forming the surface, such as impregnating wood, pretreating concrete, etc., or by "painting" the surface with liquid bis tributyltin oxide or with bis tributyltin oxide in a suitable vehicle, such as paint, lacquer, plastisol, etc.; and (3) by adding bis tributyltin oxide directly to the liquid (or pulp) in the system at a point where the liquid is moving rapidly, for example in the suction end of a pump, at a constricted orifice, etc.

It is preferred to add at least 0.03 to 0.04 part per million per day (based on liquid in the circuit) of bis-tributyltin oxide when adding the chemical to paper making circuits containing a relatively dilute pulp, e.g., 2% solids in the circuit. Amounts as low as 0.01 part per million of bis-tributyltin oxide in the circuit are effective to control slimes. The maximum amount of this chemical added is dependent upon economies as well as the process conditions in the system. Climatic and process variables may at times be more favorable to microorganism growth and larger amounts of bis tributyltin oxide would be needed to effectively control the slime level.

Substantially the entire amount of the bis tributyltin oxide added to the paper making system appears in the paper product. Paper produced as the product of systems which have been treated with this chemical exhibit biocidal activity. These treated papers have shown spectral activity against microorganisms. When tested for their activity against bacteria and fungi, they have proven effective against both. To date, analytical techniques for determining the amount of bis tributyltin oxide in paper have not been worked out. Tin analyses of the paper have been successfully completed but it has not been possible to differentiate between "active" tin derived from bis tributyltin oxide and the tin in the paper picked up from other sources such as that leached from tin-containing equipment in the paper making system, etc. The difference between the two types of tin shows up in the biocidal activity of the paper produced. The product of a typical paper making system to which additions of bis tributyltin oxide had not been made, contained 1.2 parts per million of tin. This paper exhibited no biocidal activity. When this system was treated by the addition of bis tributyltin oxide, the tin in the compound addition being equivalent to 2.75 parts per million based on the amount of paper produced, the paper had a tin content of 3.7 parts per million and exhibited marked biocidal activity. The minimum amount of active tin in the paper contemplated within the scope of the present invention is 1 part per million and the preferred range is 1 part per million to 200 parts per million. The maximum amount of tin contemplated for preparing treated paper having exceedingly high biocidal activity would be about 0.1%.

The present invention contemplates the treatment of paper making systems used to prepare all types of commercial paper. The treated papers exhibiting biocidal activity include commercial papers generally and such specialties as paper used for making box board, paper packaging materials, wall paper, the paper covering for plaster board, etc.

Under specified conditions, control of slimes in paper making systems may be obtained by the addition of bis-tributyltin oxide in conjunction with other treating chemicals, such as phenyl mercuric acetate, trichlorophenols, etc.

The following examples are further illustrative of the present invention. It is to be understood, however, that this invention is not restricted thereto.

*Example 1*

It has been found that the addition of a total of 9 pounds of bis tributyltin oxide per day (made in 3 pound additions at 8 hour intervals) to a sulfite circuit of a mill producing 160 tons of sulfite pulp a day, and having approximately 16 million gallons of water in the sulfite circuit, effectively held the microorganism content to levels sufficiently low so that they did not interfere with the paper making process. A test of the bacterial population per milliliter before the first addition of bis tributyltin oxide showed an average bacterial count of 1,431,000. During the 8 hours succeeding the first 3 pound addition of bis tributyltin oxide, the average bacterial count remained in the range of 240,000 to 560,000.

The 160 tons of sulfite pulp were blended with 470 tons of untreated ground wood pulp to produce 630 tons of news pulp per day. The treated paper had a tin content of 3.7 parts per million. Samples of untreated paper (blanks) analyzing 1.2 parts per million of tin, did not exhibit any fungistatic and/or bacteriostatic properties. Thus, the treated paper contained 2.5 parts per million of active tin derived from the bis tributyltin oxide addition to the pulp system (if all the bis tributyltin oxide added to the paper making system appeared on the paper product, the paper would have contained 2.75 parts per million of active tin). When tested, this treated paper proved fungistatic and bacteriostatic.

*Example 2*

A ground-wood circuit producing 470 tons of pulp a day (the general pulp consistency being about 2% solids) was treated with 30 pounds per day, made in 10 pound additions at 8 hour intervals, of bis tributyltin oxide. Prior to the treating of this system, large amounts of slime were visually observed at various quiescent places in the system, at screens, etc., and frequent breaks in the paper on the paper making machine were caused by slime accretions. After the addition visual observation of the system showed that the slime content had markedly decreased and breaks on the paper making machines attributable to slimes were virtually non-existent.

*Example 3*

A stock line circuit producing sales pulp paper had an average bacterial count per milliliter of 8,800,000. Ten minutes after the addition of 5 pounds of bis tributyltin oxide the average bacterial count had dropped to less than 100,000. One hour later it had risen to an average count of 1,165,000 and remained in the range of 1,630,000 to 3,125,000 until the next 5 pound addition four and one-half hours later. Thereafter, the average bacterial count remained between about 500,000 and 2,145,000.

*Example 4*

A paper making circuit exhibiting large amounts of slime and having numerous breaks in the paper attributable to slimes was treated by painting liquid bis-tributyltin oxide on the sides of various storage tanks and header boxes in the system. Visual observation showed that the slime content in the system dropped markedly.

While the invention has been described with particular reference to specific embodiments, it is to be understood that it is not limited thereto but is to be construed broadly and restricted solely by the scope of the appended claims.

What is claimed is:

1. A process for controlling the slime content of a paper manufacturing system which comprises incorporating in the system a biocidally effective amount of bis tributyltin oxide whereby the slime content of the system is reduced.

2. A process according to claim 1, wherein the bis tributyltin oxide is added to the paper pulp.

3. A process according to claim 1, wherein the bis tributyltin oxide is added to a circulating fluid in said system.

4. A process according to claim 1, wherein the bis tributyltin oxide is incorporated in the system by treatment of at least one of the surfaces of said system with the bis tributyltin oxide maintained in a suitable vehicle.

5. A process according to claim 1, wherein the bis tributyltin oxide is employed in the form of an emulsion.

6. A process according to claim 1, wherein the bis tributyltin oxide is used in the form of a self-emulsifiable concentrate with an alkylated polyether alcohol.

7. A process for controlling the slime content in a paper manufacturing system which comprises adding to a circulating fluid in said system, at least 0.01 part per million based on the liquid in the system of bis tributyltin oxide whereby the slime content of the system is reduced.

8. A process according to claim 7, wherein at least 0.03 to 0.04 part per million of bistributyltin oxide are employed.

9. A process according to claim 7, wherein the bis tributyltin oxide is introduced into the system at a point where the circulating fluid is moving rapidly.

10. A process for controlling the slime content in a paper manufacturing system which comprises adding to a circulating relatively dilute fluid pulp at least 0.01 part per million of bis tributyltin oxide based on the liquid in the system.

11. A process according to claim 10, wherein the circulating fluid pulp contains about 2% solids.

12. A process according to claim 10, wherein at least 0.03 to 0.04 part per million of bis tributyltin oxide based on the liquid in the system, is added to the system.

13. A paper product exhibiting biocidal activity, said paper product having incorporated therein a biocidally effective amount of bis tributyltin oxide.

14. A paper product exhibiting biocidal activity, said paper product having incorporated therein at least 1 part per million of biocidally active tin based on the weight of paper, said tin having been incorporated in the paper in the form of bis tributyltin oxide.

15. In a process for producing paper products, the improvement in the pulp process of manufacturing paper which comprises incorporating into the pulp circuit, before the pulp reaches the paper making machines, a biocidally effective amount of bis tributyltin oxide, to effectively control the slime content of the pulp circuit and to produce a paper product exhibiting biocidal activity.

16. A paper product exhibiting biocidal activity, said paper product having incorporated therein biocidally active tin in an amount within the range of about 1 to 200 parts per million based on the weight of paper, said tin having been incorporated in the paper in the form of bis tributyltin oxide.

References Cited in the file of this patent

UNITED STATES PATENTS

| | | |
|---|---|---|
| 1,744,633 | Hartmann et al. | Jan. 21, 1930 |
| 2,221,339 | Allison | Nov. 12, 1940 |
| 2,702,777 | Kerr | Feb. 22, 1955 |

FOREIGN PATENTS

| | | |
|---|---|---|
| 203,863 | Australia | Jan. 21, 1930 |
| 734,119 | Great Britain | July 27, 1955 |

OTHER REFERENCES

Rampel: Control of Bacteria and Fungi in Paper Mills, Tappi Section, pp. 209–211, Nov. 29, 1945.

Holmes: Slime Control in Paper Mills, Tappi Section, pp. 164–166, Sept. 25, 1941.